Fig. 2

INVENTOR.
JAMES L. HENSLEY

Fig. 4

INVENTOR
JAMES L. HENSLEY

INVENTOR
JAMES L. HENSLEY
ATTORNEYS

Sept. 1, 1964　　　　J. L. HENSLEY　　　　3,146,553
SEVERING APPARATUS

Filed May 29, 1961　　　　　　　　　　8 Sheets-Sheet 7

INVENTOR
JAMES L. HENSLEY
BY *Burns, Doane, Benedict, Swecker + Mathis*
ATTORNEYS United States Patent Office 3,146,553
Patented Sept. 1, 1964

3,146,553
SEVERING APPARATUS
James L. Hensley, Clinton, Tenn., assignor, by mesne assignments, to Tysaman Machine Company, Inc., Knoxville, Tenn., a corporation of Delaware
Filed May 29, 1961, Ser. No. 113,272
19 Claims. (Cl. 51—99)

This invention relates to severing apparatus and more particularly to abrasive cut-off saws for cutting through pieces of work. Although the invention may be used in the cutting of various types of work, it is especially advantageous when used in the cutting of metal workpieces that are particularly difficult to cut because of their size and/or composition.

Considerable difficulty has been experienced heretofore in the cutting of certain types of work. Some of the high-temperature alloy steels now being used in missiles and the like are very hard. Moreover, refinements in metallurgical techniques have led to the production of massive metal bodies that are extremely difficult to handle during cutting operations.

An example of the type of problem with which the present invention is particularly concerned is the cutting of large cylindrical bodies of hard steel alloys. In the consumable electrode process now being used in the steel industry, it is customary to prepare these alloys in the form of large bodies having diameters of up to 20 inches or more. These bodies are intended for use as consumable electrodes and they are supposed to be solid throughout. However, imperfections in the form of holes appear with some frequency. In order to eliminate such imperfections, it is customary to cut off the imperfect portions of the bodies prior to further processing. Prior to the present invention, these cutting operations usually were carried out by the use of hacksaws. However, this procedure proved to be a very slow one. The making of a single cut with a hacksaw through one of these large hard bodies frequently required several hours and several blade changes. Then, additional delays were encountered in setting up the equipment prior to the next cutting operation.

It is an object of this invention to provide an abrasive cut-off saw so constructed that it may be used to carry out difficult severing operations quickly and safely.

Another object of this invention is to provide cut-off apparatus with means for handling large bodies of work and bringing them into proper position with respect to an abrasive cutting wheel.

Another object of the invention is to provide apparatus capable of bringing about a more effective cleaning and cooling action in the zone of contact between a rotating cut-off wheel and a workpiece.

Yet another object of the invention is to provide a cut-off saw of the type having a rotating abrasive wheel and means for rotating the work during cutting, with means for quickly and easily changing the position of the work relative to the wheel during the intervals between cutting operations.

The foregoing and other objects may be realized, in accordance with a preferred embodiment of the invention, by the provision of a cut-off machine having a vertically movable abrasive wheel mounted for rotation about a horizontal axis, having means for positioning the work and rotating it about an axis parallel to the axis of rotation of the abrasive wheel, and having means for directing coolant liquid directly into the zone of contact between the periphery of the abrasive wheel and the work.

A more complete understanding of the invention will be gained from a consideration of the following detailed description of certain embodiments thereof illustrated in accompanying drawings, in which.

Figure 1:
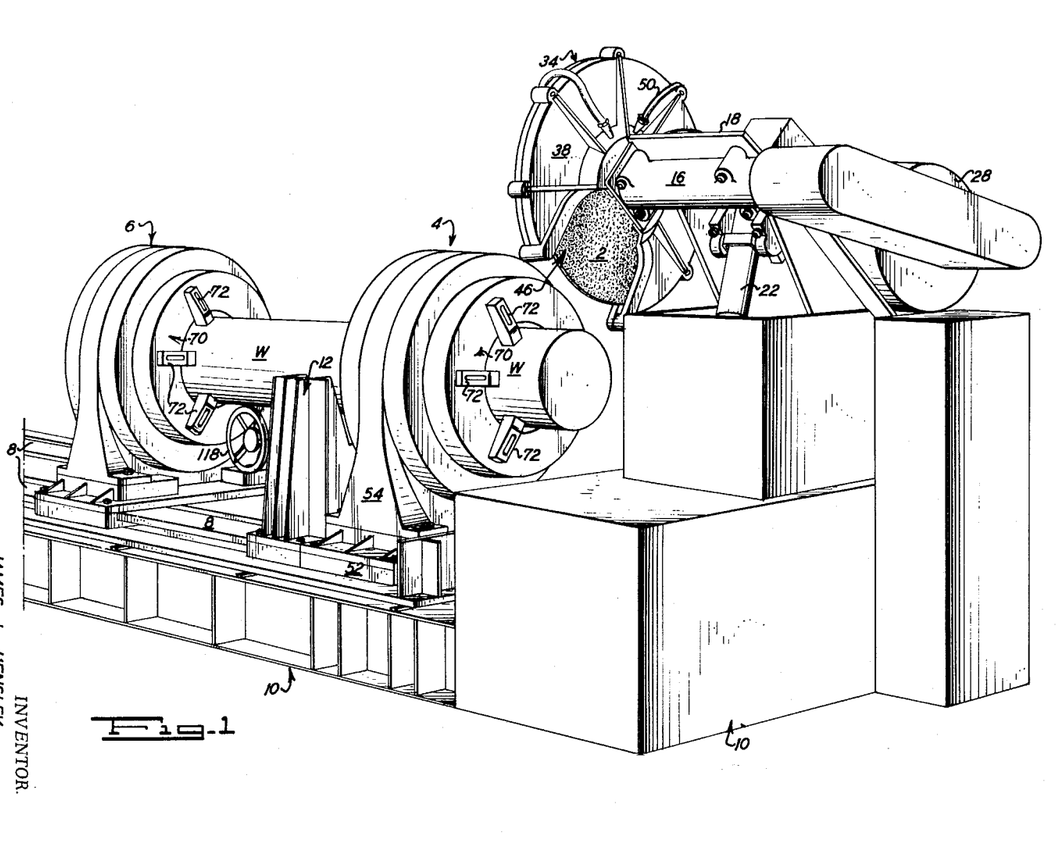
FIG. 1 is a perspective view of a cut-off machine constructed in accordance with the invention.
Figure 2:
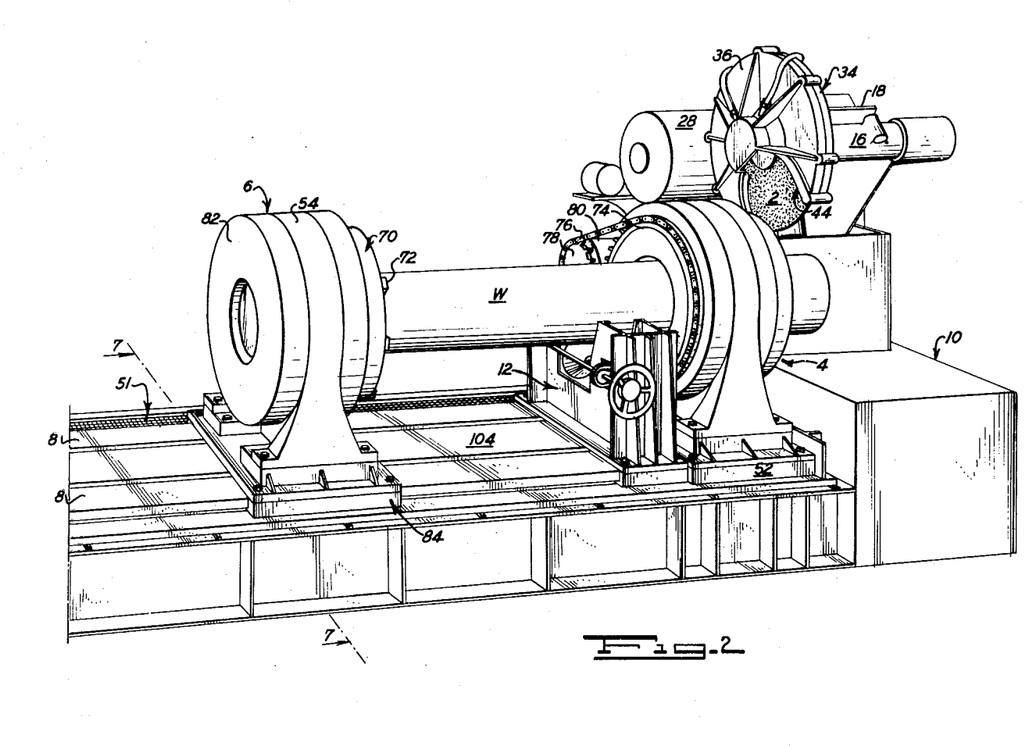
FIG. 2 is another perspective view of this machine taken from a different position.

The work W illustrated in FIGURES 1 and 2 is an elongated piece of circular cross section. This configuration is typical of the workpieces that may be handled by the machine of this invention, but it will be understood that the utility of the machine is in no way limited by the shape of the work. The machine can be used to cut workpieces of oval, rectangular, or even irregular cross sections.

The cutting of the work W is accomplished by an abrasive wheel or blade 2 mounted for rotation about a horizontal axis and for bodily movement in a vertical plane to bring its rotating periphery into contact with the work W. The work W is held during the cutting operations by a first work-holding unit 4 located close to the plane of action of the saw wheel 2 and a second work-holding unit 6 located near the opposite end of the work W. The actual work-gripping portions of the units 4 and 6 are mounted for rotation about an axis extending longitudinally through the work W, and the work W is rotated during cutting so that a severing operation will be completed when the periphery of the abrasive wheel 2 has moved downwardly to the axis of rotation of the work W. This is particularly important where the work to be cut is of large diameter.

The work-holding units 4 and 6 are mounted on parallel tracks 8 carried by the frame 10 of the machine, and at least the second work-holding unit 6 may be moved longitudinally along tracks 8 to facilitate handling of the work W. The first work-holding unit 4 may be held stationary or it may be movable along the tracks 8. Also, a novel work supporting and guiding unit 12 may be located between the two-work-holding units 4 and 6. These features of the invention will be described in detail below.

Figure 3:
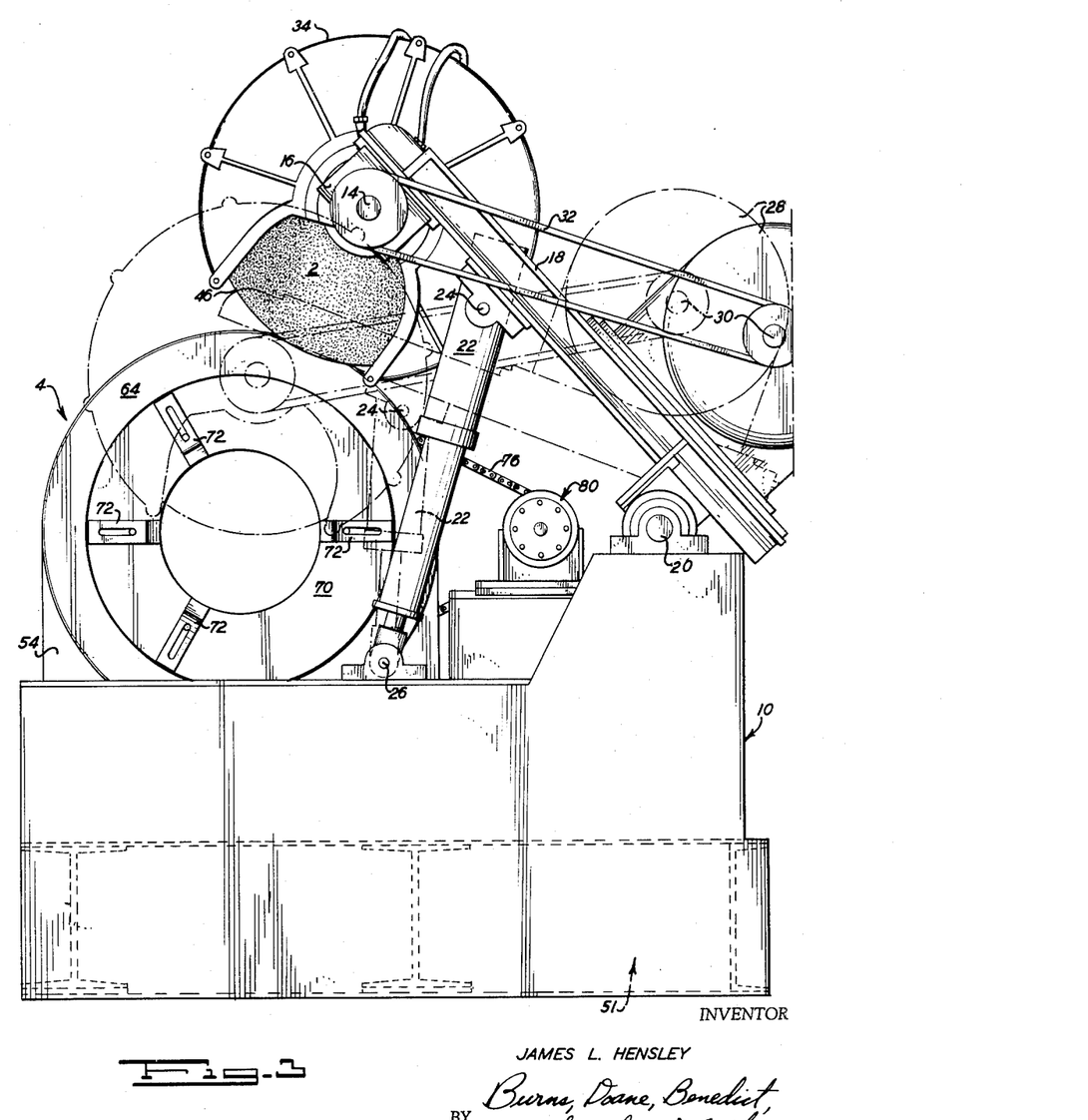
FIG. 3 is an end elevational view taken at the right end of FIG. 1 and which certain cover members have been removed to reveal the interior construction.

The means for operating the saw wheel 2 are shown best in FIG. 3 of the drawings. The saw wheel 2 is secured to a shaft 14 mounted for rotation in a bearing unit 16 attached to a platform or carrier 18. The platform 18 is, in turn, mounted for pivotal movement about the axis of a horizontal shaft 20 supported on the frame 10 of the machine.

An hydraulic cylinder and piston assembly 22 is pivotally connected at 24 to the platform 18 and is pivotally connected at 26 to the frame 10. The hydraulic cylinder and piston assembly 22 operates in a conventional manner to expand and contact in response to changes in the fluid connections therefor. In the expanded condition of the cylinder and piston assembly 22, the platform 18 is held in an elevated position illustrated in full lines in FIG. 3. Upon contraction of the cylinder and piston assembly 22, the platform 18 will swing downwardly about the axis of the shaft 20 to lower the abrasive wheel 2 into engagement with the surface of the work to be cut. A lowered position of the platform 18 and the cutting wheel 2 is illustrated in broken lines in FIG. 3.

A large, heavy duty, electric motor 28 for driving the saw wheel 2 is mounted on the platform 18. Power is transmitted from the motor shaft 30 to the saw wheel shaft 14 through endles belt means 32 passing around sheaves secured to the shafts.

Figure 4:
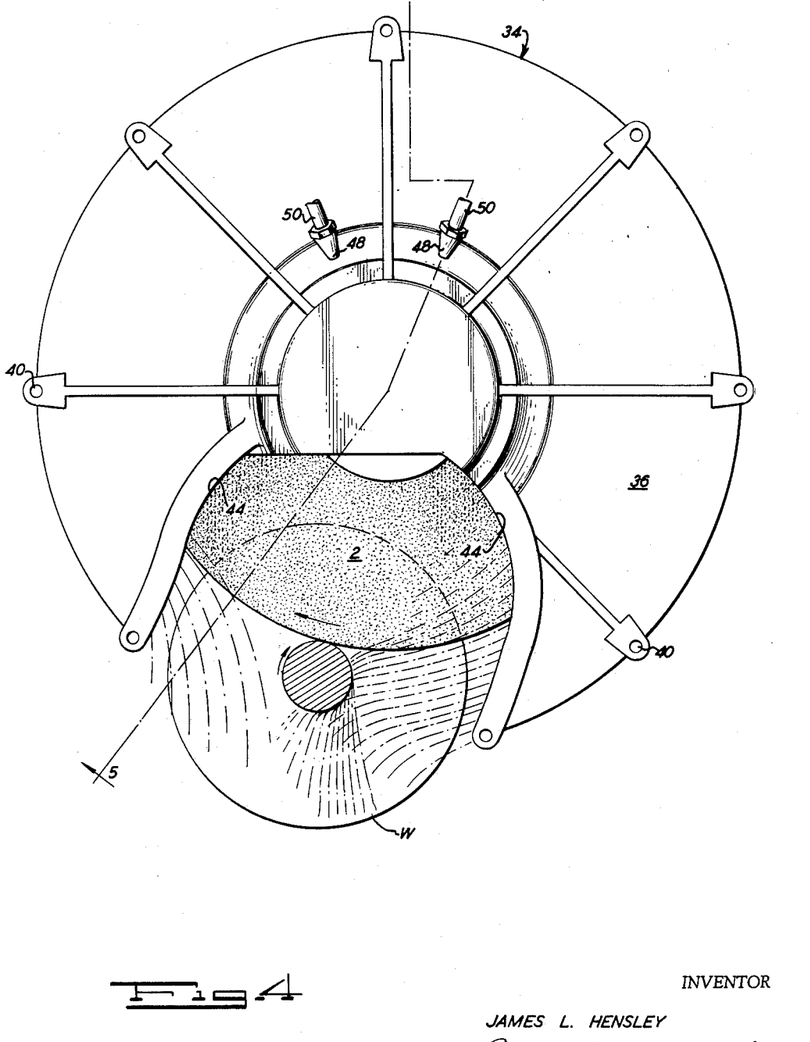
FIG. 4 is a side elevational view of the guard for the abrasive wheel of the saw of FIG. 1, illustrating diagrammatically the manner in which the wheel guard structure directs coolant liquid into the cut produced by the abrasive wheel.
Figure 5:
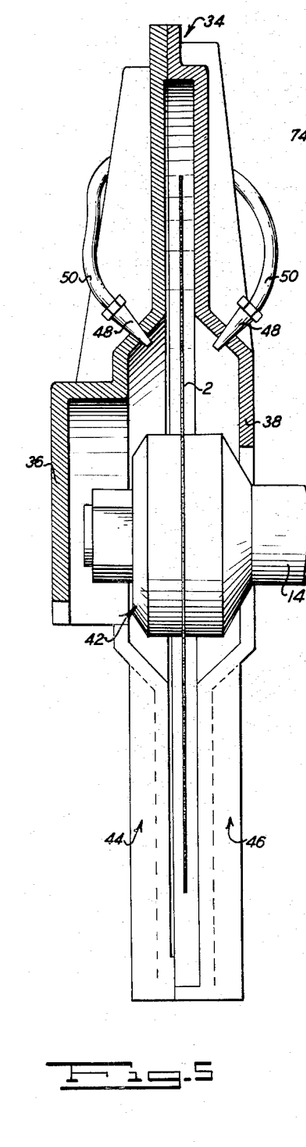
FIG. 5 is a cross sectional view of the wheel guard taken along the line 5—5 in FIG. 4.

The platform 18 also supports a wheel guard 34 illustrated best in FIGS. 4 and 5. The guard 34 includes matching front and back members 36 and 38 of generally circular configuration secured together at intervals about their peripheries by bolts (not illustrated) passing through aligned holes 40. The back wall member 38 is secured to the platform 18, and the wheel shaft 14 enters the guard 34 through an opening in this wall. The abrasive wheel 2 is fixed to the shaft 14 within the guard 34 by suitable hub means 42 of conventional construction. As shown best in FIG. 5, the walls of the guard 34 fit closely about the peripheral portions of the abrasive wheel 2 to minimize the amount of air carried along by the rapidly rotating wheel.

However, the lower portion of the wheel guard 34 is provided with a work-receiving opening that exposes the portion of the abrasive wheel 2 which engages the work W to effect the severing action. This work-receiving opening in the guard 34 is formed by matching openings 44 and 46 in the front and back walls 36 and 38. The opening 46 is shown best in FIGS. 1 and 3 of the drawings, and the opening 44 is shown best in FIGS. 2 and 4.

One of the difficult problems associated with the type of cutting operation contemplated by this invention is that of keeping the abrasive wheel and the work cool. This problem has been solved, in the illustrated embodiment of the invention, by providing means for projecting coolant liquid onto the blade 2 within the wheel guard 34. Nipples or nozzles 48 are attached to the front and back members 36 and 38 of the wheel guard 34 at locations above the axis of rotation of the wheel 2. These nipples 48 are connected to flexible hoses 50 that lead to a suitable source of liquid under pressure. Liquid passes through the hoses 50 and is directed by the nozzles 48 against both faces of the rotating abrasive wheel 2. As the wheel rotates, the liquid is distributed over its faces to bring about a very effective cooling action.

As indicated diagrammatically by the broken lines in FIG. 4, the work W also is cooled by the liquid delivered through the hoses 50. A substantial body of liquid is picked up by the rapidly rotating blade 2 and projected thereby directly into the cut being formed in the work. The excess coolant liquid passes from the wheel 2 outwardly to the extremities of the wheel guard 34 and is conducted by the wheel guard to the margins of the work-receiving opening in the lower portion thereof. The liquid flowing from the margins of the work-receiving opening passes directly onto the work W. Thus the coolant liquid is delivered efficiently to the work in quantities so that it may exert a cooling action of the very portion of the work being acted upon by the abrasive wheel 2.

This result is made possible by the shape of the work-receiving opening in the wheel guard 34 that permits the guard to close substantially around the work W being cut. At shown clearly in FIG. 4, the lateral margins of the work-receiving opening in the guard 34 actually extend below the level of the top of the work to confine the flowing liquid and assure its delivery to the cutting zone. This feature of the invention is very important. Without proper coolant distribution, the saw will not function properly. The novel guard structure of this invention overcomes the difficulty by delivering the coolant efficiently to the area where it is needed. As a result, the life of the abrasive wheel 2 is prolonged, and the severing of very large diameter workpieces is feasible and practical.

The novel wheel guard 34 also provides maximum protection for the operator of the machine. By closing around the work W as shown in FIG. 4, the guard 34 is always in position to intercept high speed solid and liquid particles thrown from the cutting zone.

The coolant liquid falling from the work W passes downwardly into a reservoir 51 in the rear of the base of the machine frame 10. As shown in FIG. 2, the reservoir 51 may extend throughout a substantial portion of the length of the machine, and it may be covered by open grill work.

Figure 6:
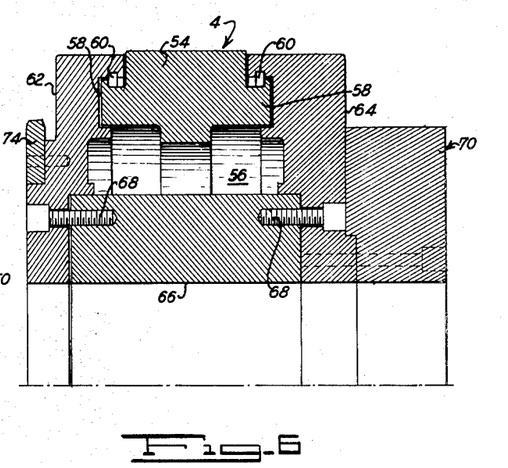
FIG. 6 is an axial cross sectional view showing an upper peripheral portion of a work-holding unit incorporated in the machine of FIG. 1.

The construction of the first work-holding unit 4 will be described with reference to FIGURES 1, 2 and 6. The unit includes a base 52 mounted upon the front end portions of the tracks 8. Fixed to the base 52 of the unit 4 is an upwardly extending standard or carriage 54 that serves as the support element for the rotating parts of the unit 4. The configuration of the standard 54 is illustrated in FIG. 6. Its interior is open, as indicated at 56, and its lateral faces are provided with circular protrusions 58 that support bearing means 60 for the rotatable ring structure of the unit 4.

The rotatable ring structure includes a pair of members 62 and 64 on opposite sides of the standard 54 and an annulus 66 extending between the members 62 and 64 through the interior opening 56 in the standard 54. The annulus 66 is connected rigidly to the members 62 and 64 by bolts 68, or other suitable means, so that the parts of the ring structure rotate as a unit.

The member 64 faces the plane of action of the abrasive wheel 2 of the machine and serves to support chuck means 70 of conventional construction. As shown in FIG. 1, the chuck means 70 includes jaw devices 72 that are movable radially into and out of gripping engagement with the exterior surface of the work W. In order that shapes other than cylinders may be held properly, the chuck preferably includes at least four of the jaw devices 72. Chuck means of this general character are well known in the art and need not be described in detail here.

The ring member 62 on the opposite side of the standard 54 has secured thereto a sprocket wheel 74 through which power is supplied to the ring structure for rotating it about its central axis. The sprocket wheel 74 is driven by a roller chain 76 that passes around a sprocket wheel 78 rotated by a motor 80. When the chuck jaws 72 are in engagement with the work W, actuation of the motor 80 to rotate the ring member 62 results in rotation of the work W about its central axis.

In installations where the unit 4 is stationary with respect to the tracks 8, the motor 80 may be mounted on the frame 10 of the machine. In installations where the unit 4 is movable along the tracks 8, the motor 80 may be mounted on a suitable bracket extending rearwardly from the base 52 of the unit 4.

The second work-holder unit 6 is similar in construction to the work-holding unit 4. It includes an upright standard 54, a rotatable ring structure carried by the standard 54, and chuck means 70 on the side of the unit 6 facing the unit 4. The ring structure is substantially the same as the ring structure in the first work-holding unit 4. However, the ring member 82 on the opposite side of the unit rom the chuck means 70 may differ slightly from the ring member 62 because it need not carry a sprocket wheel. The ring structure of the second work-holding unit 6 may be rotated about its central axis by means of the work itself.

The upright standard 54 of the second work-holding unit 6 forms part of a longitudinally movable carriage that also includes a base 84 slidably positioned upon the longitudinally extending tracks 8.

Figure 7:
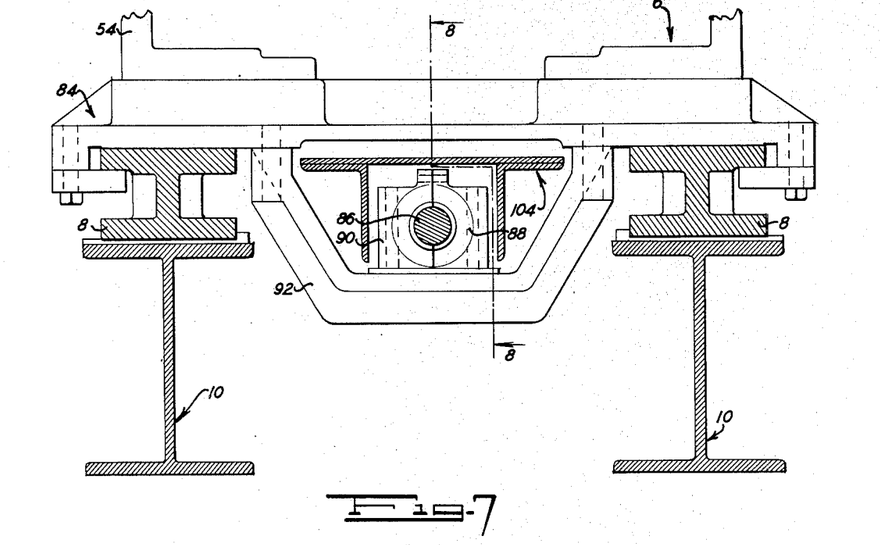
FIG. 7 is a vertical cross sectional view through the base of the machine, taken along the line 7—7 in FIG. 2.
Figure 8:
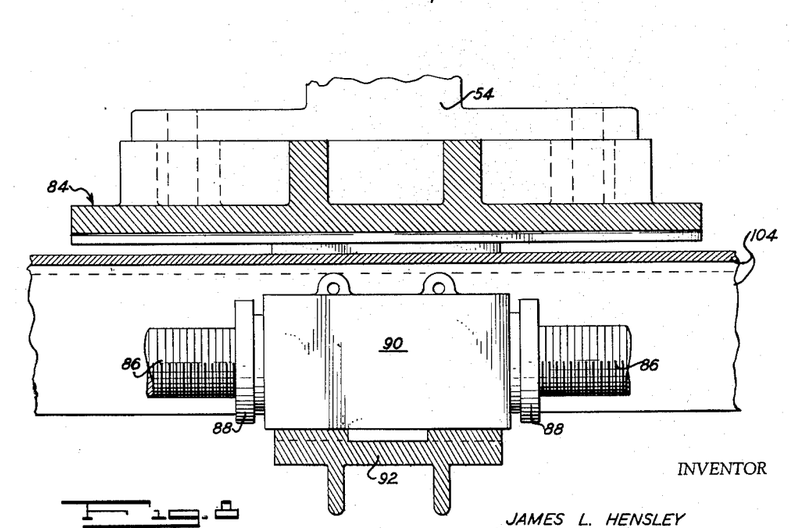
FIG. 8 is a longitudinal cross sectional view taken along the line 8—8 in FIG. 7.

As shown in FIGURES 7 and 8, a feed screw 86 passes beneath the base 84 of the movable carriage for the second work-holding unit 6 in the space between the two tracks 8. The screw 86 is mounted for rotation in bearing means located at the ends of the machine and is driven from a suitable power source. Nut means 88, which for convenience of assembly may be split longitudinally, is held in position on the screw 86 by a clamp structure 90 carried by a bracket 92. The bracket 92 extends laterally from the area of the screw 86 and then upwardly on both sides thereof. Its ends are connected rigidly to the base 84 of the movable carriage. Thus, it will be seen that the nut means 88 is secured against rotation relative to the screw 86 and against longitudinal movement relative to the carriage 84. When the screw 86 is rotated, the nut means 88 will move longitudinally, and this motion will be transmitted to the base 84 of the carriage of the unit 6 to shift the unit 6 longitudinally along the tracks 8.

In the embodiment illustrated in FIGS. 7 and 8, there is only one feed screw 86 and only the second work-holding unit 6 moves longitudinally along the tracks 8. However, both of the work-holding units 4 and 6 may be longitudinally movable, if desired, by means such as that illustrated in FIG. 9. In this embodiment there are two longitudinal feed screws 94 and 96. The feed screw 94 drives nut means 98 fixed to a bracket 100 rigid with the base member 84 for the carriage of the unit 6, and the other feed screw 96 is similarly connected to the unit 4. The shape of the bracket 100 is such as to permit the feed screws 94 and 96 to operate without interfering with each other. Power means may be provided for independently rotating the screws 94 and 96.

The cutting operation carried out by the machine of this invention results in the production of small particles that could cause difficulties if they were allowed to collect on the carriage feed screw means. Moreover, when water is used as the coolant liquid, it is undesirable for the water particles to come in contact with the working portion of the feed screw means because of the danger of a rusting effect. In order to eliminate the possibility of difficulties of this sort, the machine is provided with a screw protector designated generally by the numeral 104 in FIGS. 2, 7 and 8. This screw protector 104 is attached to the machine frame 10 and it extends longitudinally over the entire working length of the screw 86. As shown best in FIG. 7, the protector 104 covers both the top and the sides of the screw 86.

Figure 9:
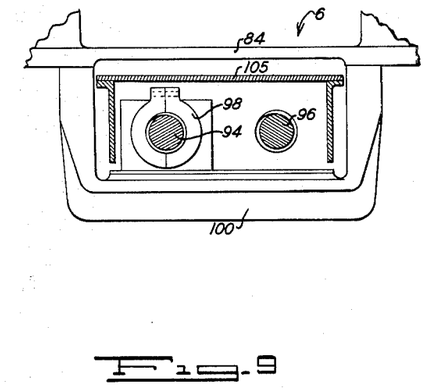
FIG. 9 is a view similar to FIG. 7 but illustrating another embodiment.

A similar screw protector 105 of slightly different shape may be provided in the embodiment illustrated in FIG. 9.

Figure 10:
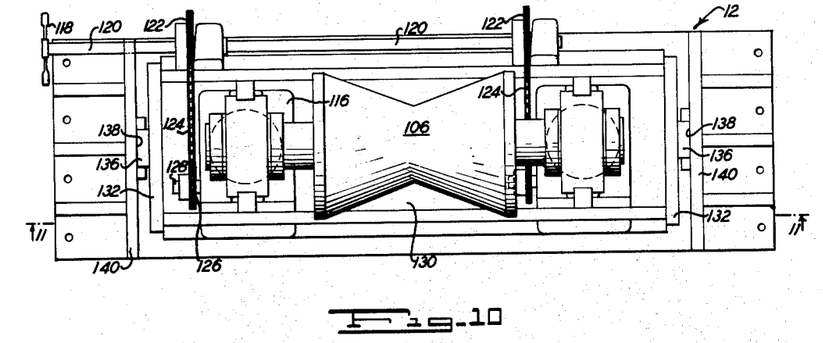
FIG. 10 is a top plan view of a work-supporting unit located between the two work-holding units in the machine of FIG. 1.
Figure 11:
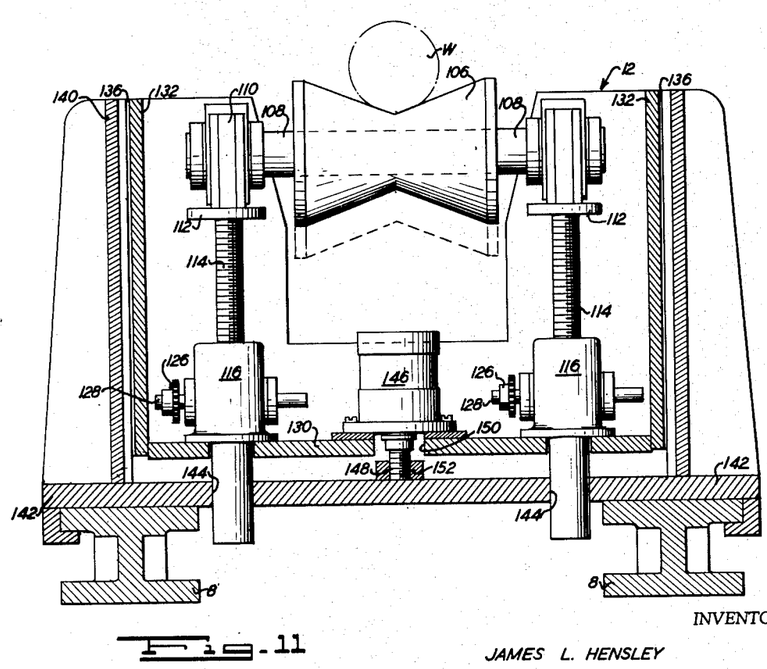
FIG. 11 is a vertical cross sectional view of the work support of FIG. 10.

The work supporting and guiding unit 12 located between the work-holding units 4 and 6 is shown best in FIGURES 10 and 11. The actual work-contacting element of the unit 12 is a roller 106 having surfaces that taper toward the middle section thereof. The roller 106 is fixed on a shaft 108 mounted in bearing means 110 for free rotation about an axis extending at right angles to the axis of rotation of the work W.

The bearing means 110 are secured to platforms 112 carried by the upper ends of screw members 114 forming parts of worm gear jacks of conventional construction designated generally by the numeral 116. Operation of the jacks 116 causes the screw members 114 to move up or down to alter the position of the axis of rotation of the roller-supporting shaft 108. In this way, the position of the roller 106 may be adjusted to accommodate workpieces of different diameters.

The jacks 116 are operated by a hand wheel 118 secured to a transversely extending shaft 120 having a pair of sprocket wheels 122 secured thereto. Drive chains 124 extend from the sprocket wheels 122 to sprocket wheels 126 mounted on the input shafts 128 of the jacks 116.

The jacks 116 are fixed in position on a vertically movable framework that includes a base member 130 and end walls 132. Guide blocks 136 are fixed to the end walls 132 in position to be received in grooves 138 formed on upright walls 140 of the stationary framework of the unit 12.

This stationary framework also includes a base portion 142 detachably mounted on the tracks 8 and having openings 144 through which the lower portions of the jacks 116 may protrude without interference.

The base member 130 of the movable framework of the unit 12 has secured thereto an hydraulic cylinder 146 which may have a very short stroke. A piston rod 148 protrudes from the bottom of the cylinder 146 and passes through an opening 150 in the base 130. At its lower end, the piston rod 148 has secured thereto a shoe 152 that rests upon the base member 142 of the stationary framework of the unit 12.

In FIG. 11, the piston rod 148 is illustrated in its fully extended position, and it will be seen that the base member 130 of the movable framework is spaced above the base member 142 of the stationary framework of the unit 12. When the hydraulic cylinder 146 is actuated to retract the piston rod 148, the base member 130 of the movable framework will be lowered a corresponding amount. Since the jacks 116 are secured to the base 130 of the movable framework, they will move with it to raise and lower the work contacting roller 106 in response to the actuations of the hydraulic cylinder 146.

The work supporting and guiding unit 12 serves a valuable function during periods when it is necessary to move the work W longitudinally relative to the first work-holding unit 4 of the machine. For example, let it be supposed that a cutting operation has been completed and that it is desired to move the work a few inches through the unit 4 in the direction of the blade 2. Before the chuck jaws 72 on the first work-supporting unit 4 are moved radially out of engagement with the work W, the hydraulic cylinder 146 is actuated to bring the work contacting roller 106 into supporting engagement with the lower surface with the work W. Then, the jaws 72 on the unit 4 are released from engagement with the work, and the feed screw 86 is rotated to move the second work-holding unit 6 forwardly toward the unit 4. During such movements, the work will be supported and guided by the roller 106 as it is being fed through the central opening in the unit 4.

When the work W has been moved far enough to position it properly, the chuck jaws 72 on the first work-holding unit 4 may be moved inwardly again to grip the work W. When the jaws 72 are in position, there is no longer any need for the support offered by the roller 106 on the work supporting and guiding unit 12. In fact, the presence of the roller 106 in contact with the work W would interfer somewhat with rotation of the work during a cutting operation. In order to move the roller 106 out of contact with the work W, it is necessary only to actuate the hydraulic cylinder 146 again to lower the movable framework of the unit 12 a short distance.

It will be apparent also that the work supporting and guiding unit 12 facilitates the initial loading of the work W into the machine. Long workpieces may be rested upon the roller 106 while they are being threaded through the openings in the work-holding units 4 and 6.

In installations where the first work-holding unit 4 is movable along the tracks 8, the base member 142 of the unit 12 may be connected to the base 52 of the unit 4 to move therewith along the tracks. Alternatively, the unit 12 may be removed entirely, if desired.

The presence of the two work-holding units 4 and 6 and the work supporting and guiding unit 12 in the embodiment of the invention illustrated in FIGURES 1 through 11 adapts it particularly for the handling of elongated workpieces. Where short pieces of work are to be handled, the embodiment illustrated in FIGURES 12 through 14 may be preferable.

Figure 12:
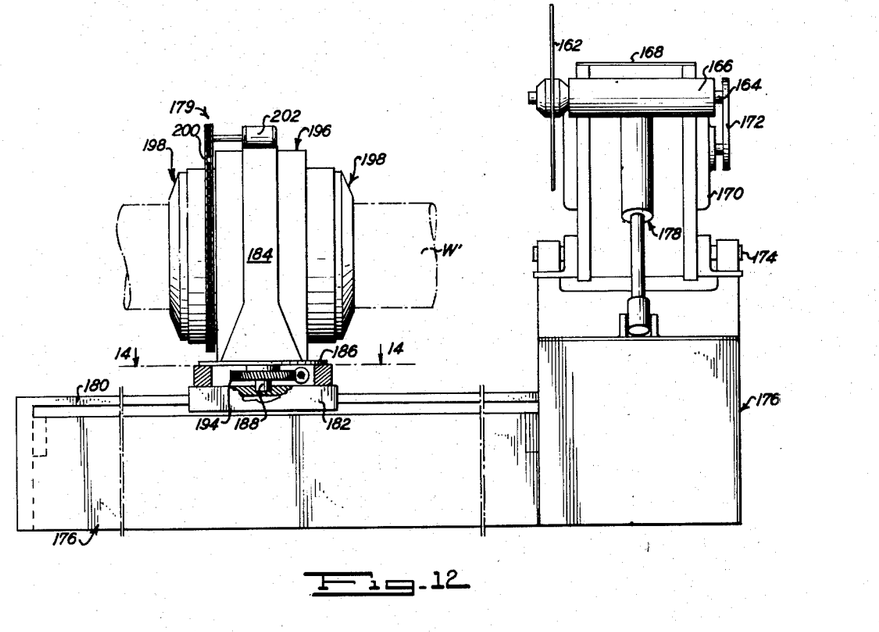
FIG. 12 is a side elevational view, with parts broken away, of another form of cut-off machine embodying certain principles of the present invention.

The structure for supporting and operating the saw blade 162 in the embodiment shown in FIG. 12 may be substantially the same as the corresponding structure shown in FIGURES 1 and 3. The wheel guard for the blade 162 has been omitted from FIG. 12 in the interests of clarity and simplicity. However, it will be understood that the wheel guard may be identical to the wheel guard 34. The blade 162 is secured to a shaft 164 rotatably mounted in a bearing unit 166 attached to a platform 168. The platform 168 carries a drive motor 170 connected to the wheel shaft 164 through belt means 172. The platform 168 is itself pivotally mounted at 174 on the base 176 of the machine, and it may be moved up and down about its pivotal axis by means of a hydraulic cylinder and piston assembly 178.

In this embodiment of the invention, there is only one work supporting unit 179, and it is mounted for longitudinal movements along tracks 180 carried by the frame 176. The unit 179 includes a base 182 for engaging the tracks 180 in the same manner that the base 84 of the carriage for the unit 6 engages the tracks 8 in the preceding embodiment. Power means for moving the base 182 along the tracks 180 may be identical to that illustrated in FIGURES 7 and 8.

Supported upon the base 182 of the unit 179 is a standard 184. This standard 184 has a plate member 186 at its lower end that rests upon a surface of the base 182 and it also has a depending spindle 188 received within a recess in the base 182. The purpose of this mounting arrangement is to permit rotation of the standard 184 about a vertical axis passing upwardly through the center of the unit 179. Any other suitable arrangement capable of permitting this result may be employed if desired.

Power for rotating the standard 184 about its vertical axis may be supplied by a motor 190 carried by the base 182 of the carriage. The motor 190 drives a worm 192 that engages a worm wheel 194 fixed on a depending portion of the standard 184.

The upper portion of the standard 184 has substantially the same configuration and function as the upper portion of the standard 54 shown in FIG. 6. It serves to support a rotatable ring structure designated generally by the numeral 196. This ring structure 196 carries conventional chuck means 198 on both of its faces, and it may be rotated about its central axis by a drive chain 200 operatively connected to the output shaft of a motor 202 fixed to the standard 184.

Figure 13:
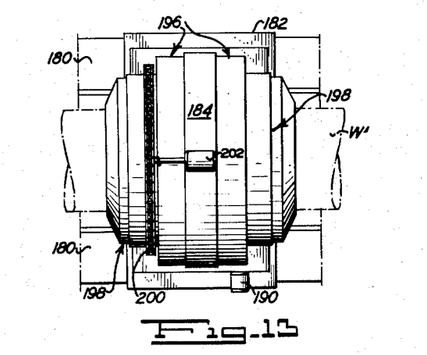
FIG. 13 is a top plan view showing the work-holding unit incorporated in the machine of FIG. 12.
Figure 14:
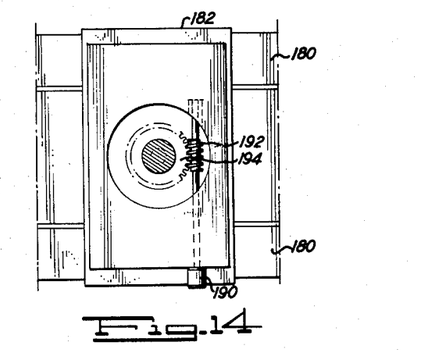
FIG. 14 is a horizontal cross sectional view taken along the line 14—14 in FIG. 12.

The form of work handling equipment illustrated in FIGS. 12 through 14 is particularly adapted for use where it is desired to make cuts at opposite ends of a relatively short workpiece. In using the equipment, a workpiece W' is positioned within the unit 179 and gripped by the chucks 198. Then, the base 182 of the carriage of the unit 179 may be moved longitudinally along the tracks 180 to bring an end portion of the work W' into the plane of action of the abrasive wheel 162. The actual cutting is brought about by rotating the abrasive wheel 162, rotating the work W', and simultaneously moving the platform 168 downwardly about the axis 174 to move the periphery of the abrasive wheel 162 through the work. After a cutting operation has been completed, the base 182 of the carriage of the unit 179 may be moved rearwardly along the tracks 180 as far as necessary, and the motor 190 may be actuated to swing the standard 184 about its vertical axis. This permits the opposite end portion of the work W' to be brought into a position facing the saw blade 162. Then, the base 182 of the carriage may be moved forwardly again to bring the work into position for another cutting action.

Although certain embodiments of the invention have been illustrated and described in detail, other variations and modifications will suggest themselves to persons of ordinary skill in the art. It is intended, therefore, that the foregoing description be considered as exemplary only and that the scope of the invention be ascertained from the following claims.

I claim:

1. In a machine of the type having a pair of parallel tracks, a frame, and a carriage movable along said tracks, the improvement which comprises a rotatable carriage feed screw between said tracks and beneath said carriage, screw protector means secured to the frame and extending along said screw on the side thereof adjacent the carriage, nut means engaging said screw and being movable therealong upon rotation of said screw, and a connecting member attached to said carriage and to said nut means on the side of the screw opposite said carriage and passing to the side of and beneath said screw protector means.

2. A cut-off machine having a rotatable saw wheel mounted for bodily movement in a plane at right angles to its axis of rotation; track means extending generally parallel to the axis of rotation of said saw wheel; a first work-holding unit spaced laterally from said plane and including a support mounted on said track means, a ring mounted on said support for rotation about an axis parallel to the axis of rotation of said saw wheel, and means on said ring including devices mounted for radial movement into and out of gripping engagement with the surface of an elongated workpiece extending through said ring; power means for rotating said ring; a second work-holding unit spaced laterally from said first work-holding unit and including a support mounted on said track means, a rotatable ring on said last-mentioned support in coaxial relation with the ring of said first work-holding unit, and means on the ring of the second work-holding unit including devices mounted for radial movement into and out of gripping engagement with the surface of the workpiece; and means for moving at least one of said work-holding units longitudinally along said track means.

3. A cut-off machine having a rotatable saw wheel mounted for bodily movement in a plane at right angles to its axis of rotation; track means extending generally parallel to the axis of rotation of said saw wheel; a first work-holding unit spaced laterally from said plane and including a support mounted on said track means, a ring mounted on said support for rotation about an axis parallel to the axis of rotation of said saw wheel, and means on said ring including devices mounted for radial movement into and out of gripping engagement with the surface on an elongated workpiece extending through said ring; a second work-holding unit spaced laterally from said first work-holding unit and including a support mounted on said track means, a rotatable ring on said last-mentioned support in coaxial relation with the ring of said first work-holding unit, and means on the ring of the second work-holding unt including devices mounted for radial movement into and out of gripping engagement with the surface of the workpiece; means for rotating at least one of said rings; and means for independently moving each of said work-holding units longitudinally along said track means.

4. A cut-off machine having a rotatable saw wheel mounted for bodily movement in a plane at right angles to its axis of rotation; track means extending generally parallel to the axis of rotation of said saw wheel; a first work-holding unit spaced laterally from said plane and including a stationary support mounted on said track means, a ring mounted on said support for rotation about an axis parallel to the axis of rotation of said saw wheel, and means on said ring including devices mounted for radial movement into and out of gripping engagement with the surface of an elongated workpiece extending through said ring; a second work-holding unit spaced laterally from said first work-holding unit and including a support mounted on said track means, a rotatable ring on said last-mentioned support in coaxial relation with the ring of said first work-holding unit, and means on the ring of the second work-holding unit including devices mounted for radial movement into and out of gripping engagement with the surface of the workpiece; power means for rotating at least one of said rings; and means for moving said second work-holding unit longitudinally along said track means relative to said first work-holding unit.

5. A cut-off machine having a rotatable saw wheel mounted for bodily movement in a plane at right angles to its axis of rotation; a first work-holding unit including a support spaced laterally from said plane, a ring mounted on said support for rotation about an axis parallel to the axis of rotation of said saw wheel, and means on said ring including jaws mounted for movement into and out of gripping engagement with the surface of an elongated workpiece extending through said ring; power means for rotating said ring; track means extending parallel to the axis of said ring on the side thereof opposite said plane; a second work-holding unit including a carriage mounted on said track means for movement therealong and work-gripping means mounted on the carriage for rotation about the axis of rotation of said ring; means for moving said carriage along said track means; and means located between said work-holding units for supporting the work as it is being moved longitudinally through said ring.

6. A cut-off machine having a rotatable saw wheel mounted for bodily movement in a plane at right angles to its axis of rotation; a first work-holding unit including a stationary support spaced laterally from said plane, a ring mounted on said support for rotation about an axis parallel to the axis of rotation of said saw wheel and means on said ring including jaws mounted for radial movement into and out of gripping engagement with the surface of an elongated workpiece extending through said ring; power means for rotating said ring; track means extending parallel to the axis of said ring on the side thereof opposite said plane; a second work-holding unit including a carriage mounted on said track means for movement therealong, a rotatable ring on said carriage in coaxial relation with said ring on said stationary support, and means on the carriage-supported ring including jaws mounted for radial movements into and out of gripping engagement with the surface of the workpiece; means for moving said carriage along said track means; and means located between said work-holding units for supporting the work as it is being moved longitudinally through said first-mentioned ring including a work-contacting element extending transversely of the path of movement of the work on the lower side thereof, mounting means for said element, means for adjusting the vertical position of said element on said mounting means, and means for moving said mounting means vertically between a raised position in which said element may contact the work and a lowered position in which said element is spaced from the work.

7. A cut-off machine having a rotatable saw wheel mounted for bodily movement in a plane at right angles to its axis of rotation; a work-holding unit including a stationary support spaced laterally from said plane, a ring mounted on said support for rotation about an axis parallel to the axis of rotation of said saw wheel, and means on said ring including devices mounted for radial movement into and out of gripping engagement with the surface of an elongated workpiece extending through said ring; power means for rotating said ring; and means on the side of said work-holding unit opposite said plane for supporting and guiding the work as it is being moved longitudinally through said ring, said last-mentioned means including roller means extending transversely of the path of movement of the work on the lower side thereof and having sloping surfaces converging downwardly toward a vertical plane passing through the axis of said ring, mounting means for said roller means, means for adjusting the roller means vertically with respect to said mounting means to accommodate workpieces of different sizes, and means for moving said mounting means vertically between a raised position in which said roller means may contact the work and a lowered position in which said roller means are spaced from the work.

8. A cut-off machine having a rotatable saw wheel mounted for bodily movement in a plane at right angles to its axis of rotation, track means extending parallel to the axis of rotation of said saw wheel, a first carriage member mounted on said track means for movement therealong, a second carriage member mounted on said first carriage member for swinging movements of at least 180° about an axis parallel to said plane, ring means mounted on said second carriage member for rotation about an axis extending at right angles to the axis of swinging movement thereof, and means on said ring means for gripping a workpiece extending through said ring means.

9. A cut-off machine having a rotatable saw wheel mounted for bodily movement in a plane at right angles to its axis of rotation, track means extending parallel to the axis of rotation of said saw wheel, a first carriage member mounted on said track means for movement therealong, means for moving said first carriage member back and forth along said tracks, a second carriage member mounted on said first carriage member for swinging movements of at least 180° about an axis parallel to said plane, means on said first carriage member for swinging said second carriage member about such axis, ring means mounted on said second carriage member for rotation about an axis extending at right angles to the axis of swinging movement thereof, means carried by said second carriage member for rotating said ring means, and means on opposite sides of said ring means for gripping a workpiece extending through said ring means.

10. A cut-off machine having a rotatable saw wheel mounted for bodily movement in a plane at right angles to its axis of rotation, track means extending generally parallel to the axis of rotation of said saw wheel, a carriage movable along said track means, an annular standard mounted on the carriage and having its central axis substantially parallel to the axis of rotation of the saw wheel, said standard having an annular flange on each opposite end thereof, a ring supported for rotation on each of said flanges, the axes of rotation of said rings being in substantially axial alignment with the central axis of said standard and each other, means connecting the rings together for unitary movement thereof, means on one of the rings for gripping a workpiece extending through the rings, and power means for moving the rings about said central axis to rotate the workpiece for cutting by the saw wheel.

11. A workholder comprising track means, a first work-holding unit including a support mounted on said track means, a ring mounted for rotation on said support, and means on the ring for gripping the surface of an elongated workpiece extending through the ring, power means for rotating said ring, a second work-holding unit spaced laterally from said first work-holding unit and including a support mounted on said track means, a rotatable ring on said last-mentioned support in coaxial relation with the ring of said first work-holding unit, and means on the ring of the second work-holding unit including devices mounted for radial movement into and out of gripping engagement with the surface of the workpiece, and means for moving at least one of said work-holding units longitudinally along said track means.

12. A workholder comprising track means, a first work-holding unit including a support mounted on said track means, a ring mounted for rotation on said support, and means on the ring for gripping the surface of an elongated workpiece extending through the ring, a second work-holding unit spaced laterally from said first work-holding unit and including a support mounted on said track means, a rotatable ring on said last-mentioned support in coaxial relation with the ring of said first work-holding unit, and means on the ring of the second work-holding unit including devices mounted for radial movement into and out of gripping engagement with the surface of the workpiece, power means for rotating at least one of said rings, and means for moving said second work-holding unit longitudinally along said track means relative to said first work-holding unit.

13. A workholder comprising a first work-holding unit including a support, a ring mounted on said support for rotation, and means on said ring including jaws mounted for movement into and out of gripping engagement with the surface of an elongated workpiece extending through said ring, power means for rotating said ring, track means extending approximately parallel to the axis of said ring, a second work-holding unit including a carriage mounted on the track means for movement therealong, work-gripping means mounted on the carriage for rotation about the axis of rotation of said ring, means for moving said carriage along said track means, and means located between said work-holding units for supporting the work as it is being moved longitudinally through said ring.

14. A workholder comprising a first work-holding unit including a support, a ring mounted on said support for rotation, and means on said ring including jaws mounted for movement into and out of gripping engagement with the surface of an elongated workpiece extending through said ring, power means for rotating said ring, track means extending parallel to the axis of said ring, a second work-holding unit including a carriage mounted on the track means for movement therealong, work-gripping means mounted on the carriage for rotation about the axis of rotation of said ring, means for moving said carriage along said track means, means located between said work-holding units for supporting the work as it is being moved longitudinally through said first-mentioned ring including a work-contacting element extending transversely of the path of movement of the work on the lower side thereof, mounting means for said element, means for adjusting the vertical position of said element on said mounting means, and means for moving said mounting means vertically between a raised position in which said element may contact the work and a lowered position in which said element is spaced from the work.

15. A workholder comprising a work-holding unit including a stationary support, a ring mounted on said support for rotation, and means on said ring including devices mounted for radial movement into and out of gripping engagement with the surface of an elongated workpiece extending through said ring, power means for rotating said ring, and means adjacent the work-holding unit for supporting and guiding the work as it is being moved longitudinally through said ring, said last-mentioned means including roller means extending transversely of the path of movement of the work on the lower side thereof and having sloping surfaces converging downwardly toward a vertical plane passing through the axis of said ring, mounting means for said roller means for holding a workpiece, means for adjusting the roller means vertically with respect to said mounting means to accommodate workpieces of different sizes, and means for moving said mounting means vertically between a raised position in which said roller means may contact the work and a lowered position in which said roller means is spaced from the work.

16. A workholder comprising an annular standard, said standard having an annular flange on each opposite end thereof, a ring mounted for rotation on each of said flanges, said rings being in substantially axial alignment with said standard and each other, means connecting the rings together for unitary movement thereof, means on one of the rings for gripping a workpiece extending through the rings, and power means for rotating the rings about said central axis to rotate the workpiece.

17. A cut-off machine having a rotatable saw wheel mounted for bodily movement in a plane at right angles to its axis of rotation, track means extending generally parallel to the axis of rotation of said saw wheel, a carriage movable along said track means, an annular standard mounted on the carriage and having its central axis substantially parallel to the axis of rotation of the saw wheel, said standard having an annular flange on each opposite end thereof, a ring mounted for rotation on each of said flanges, said rings being in substantially axial alignment with said standard and each other, means connecting together said rings for unitary rotational movement, means on one of said rings for gripping a workpiece extending through said rings, power means for rotating one of said rings, and power means for moving said carriage longitudinally along said track means prior to a cutting operation to position the desired portion of the work in said plane to be acted upon by the periphery of the rotating saw wheel.

18. A cut-off machine having a rotatable saw wheel mounted for bodily movement in a plane at right angles to its axis of rotation, track means extending parallel to the axis of rotation of said saw wheel, a first carriage member mounted on said track means for movement therealong, a second carriage member mounted on said first carriage member for swinging movements about an axis parallel to said plane, ring means mounted on said second carriage member for rotation about an axis extending at right angles to the axis of swinging movement thereof, and means on said ring means for gripping a workpiece extending through said ring means.

19. A cut-off machine having a rotatable saw wheel mounted for bodily movement in a plane at right angles to its axis of rotation, track means extending parallel to the axis of rotation of said saw wheel, a first carriage member mounted on said track means for movement therealong, means for moving said first carriage member back and forth along said tracks, a second carriage member mounted on said first carriage member for swinging movements about an axis parallel to said plane, means on said first carriage member for swinging said second carriage member about such axis, ring means mounted on said second carriage member for rotation about an axis extending at right angles to the axis of swinging movement thereof, means carried by said second carriage member for rotating said ring means, and means on opposite sides of said ring means for gripping a workpiece extending through said ring means.

References Cited in the file of this patent
UNITED STATES PATENTS

| | | |
|---|---|---|
| 722,810 | Carter et al. | Mar. 17, 1903 |
| 2,303,438 | Cornelius | Dec. 1, 1942 |
| 2,492,684 | Coates | Dec. 27, 1949 |
| 2,707,854 | Johnson | May 10, 1955 |
| 2,764,801 | Miller et al. | Oct. 2, 1956 |
| 2,787,092 | Smith | Apr. 2, 1957 |
| 2,810,187 | Klein | Oct. 22, 1957 |
| 2,842,908 | Allison | July 15, 1958 |
| 2,848,853 | Wittkopp | Aug. 26, 1958 |
| 2,863,440 | Harclerode | Dec. 9, 1958 |